Figure 1:
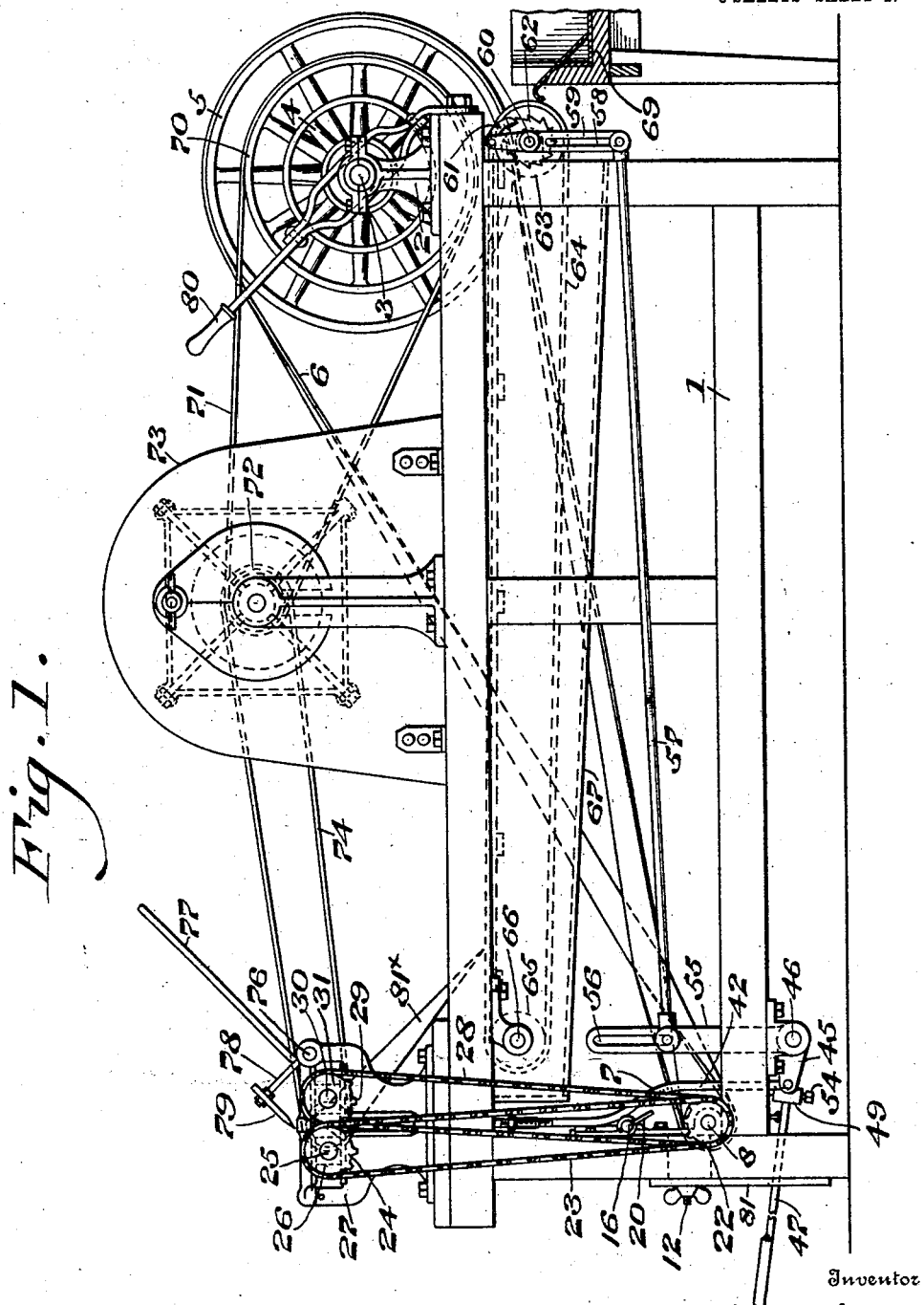

J. SMITH.
CANDY MACHINE.
APPLICATION FILED AUG. 19, 1907.

930,099.

Patented Aug. 3, 1909.
3 SHEETS—SHEET 1.

Witnesses
Daniel Webster, Jr.
P. F. Nagle.

Inventor
John Smith.
By Wiederoheim Fairbanks
Attorney

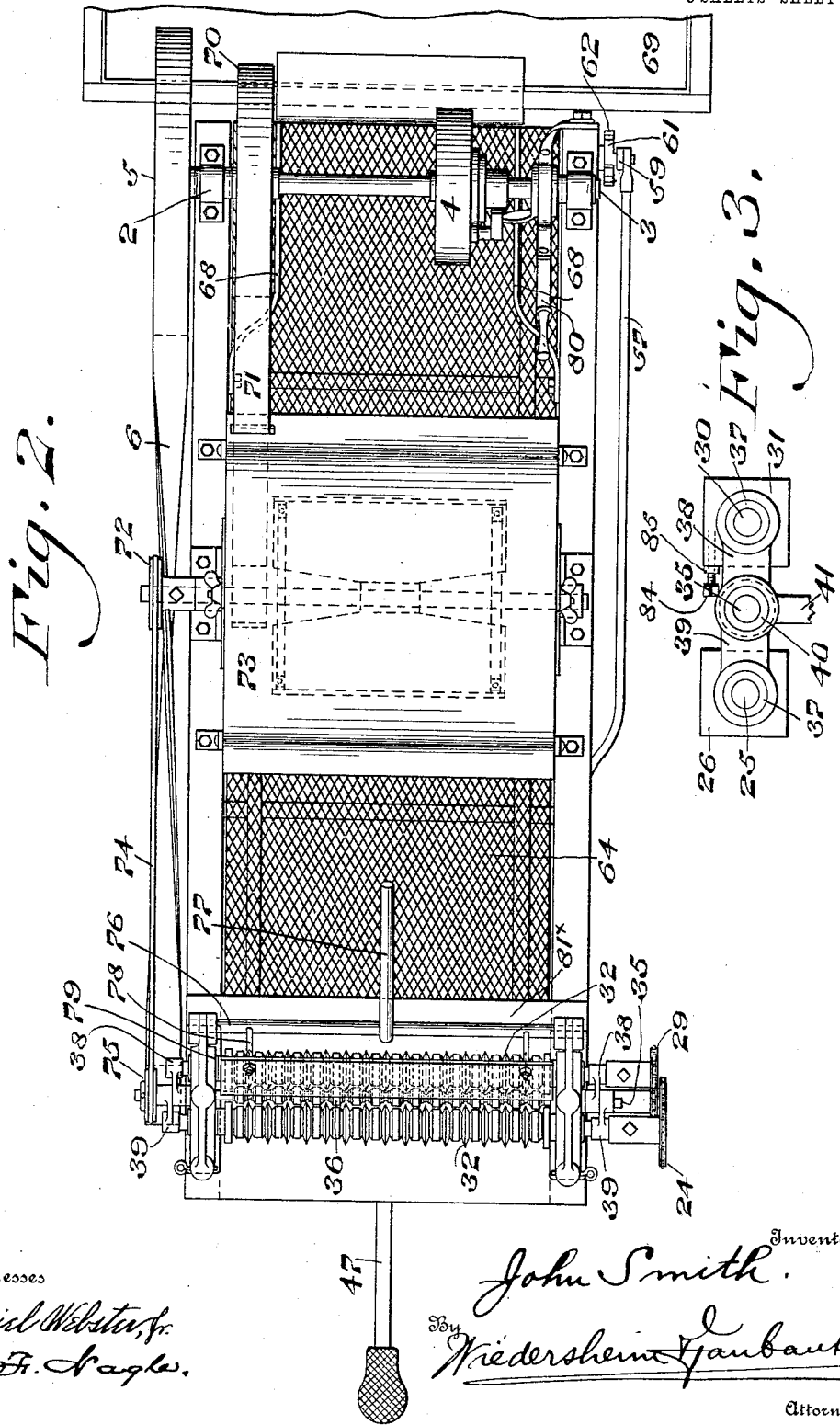

J. SMITH.
CANDY MACHINE.
APPLICATION FILED AUG. 19, 1907.
930,099.
Patented Aug. 3, 1909.
3 SHEETS—SHEET 3.
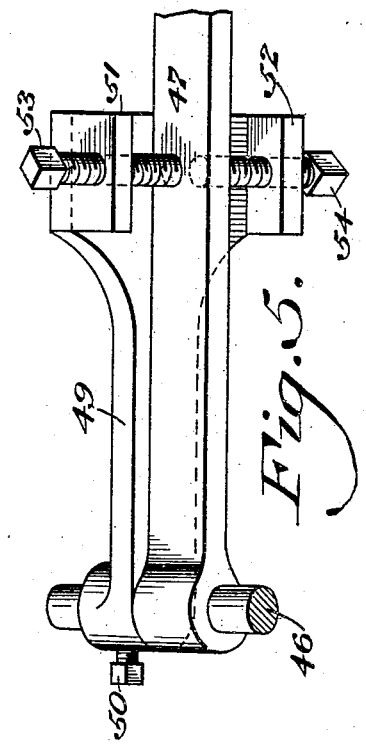
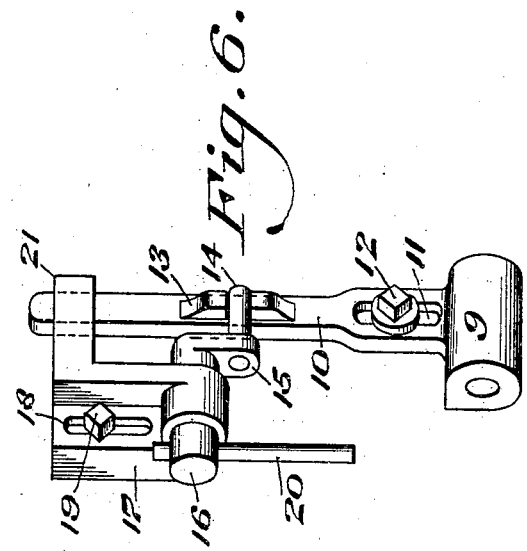
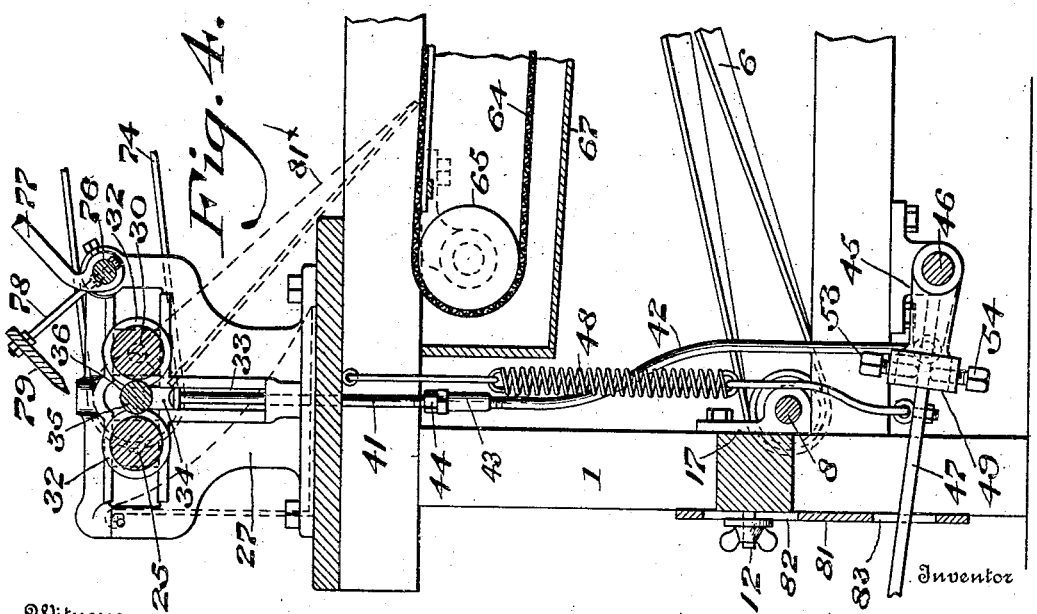
Witnesses
Daniel Webster, Jr.
P. F. Nagle.
Inventor
By John Smith.
Wiedersheim Fairbanks
Attorney

UNITED STATES PATENT OFFICE.

JOHN SMITH, OF PHILADELPHIA, PENNSYLVANIA, ASSIGNOR OF ONE-HALF TO HENRY BRANDLE, OF PHILADELPHIA, PENNSYLVANIA.

CANDY-MACHINE.

No. 930,099.           Specification of Letters Patent.           Patented Aug. 3, 1909.

Application filed August 19, 1907. Serial No. 389,111.

*To all whom it may concern:*

Be it known that I, JOHN SMITH, a citizen of the United States, residing in the city and county of Philadelphia, State of Pennsylvania, have invented a new and useful Candy-Machine, of which the following is a specification.

My present invention consists of a novel construction of a candy machine by the employment of which the candy may be cut into any desired form and gradually cooled before it passes out of the machine.

It further consists of a novel construction of a device in which an apertured conveyer preferably composed of wire screening is employed on to which the candy passes from the cutting mechanism in combination with novel means for maintaining a current of air against said belt and the candy thereon, and novel means for continuously or intermittently actuating said belt.

It further consists in novel means for adjusting the bearings when the same become worn.

It further consists of novel means for adjusting the amount of movement given to the endless belt or conveyer apron.

It further consists of other novel features of construction, all as will be hereinafter fully set forth.

For the purpose of illustrating my invention, I have shown in the accompanying drawings one form thereof, since this embodiment has been found in practice to give satisfactory and reliable results, although it is to be understood that the various instrumentalities of which my invention consists can be variously arranged and organized and that my invention is not limited to the exact arrangement and organization of these instrumentalities as herein shown.

Figure 1 represents a side elevation of a candy machine embodying my invention. Fig. 2 represents a plan view thereof. Fig. 3 represents a side elevation of a portion of Fig. 2 showing more clearly part of the toggle mechanism for actuating the cutting rollers. Fig. 4 represents a sectional elevation of a portion of the machine. Fig. 5 represents a perspective view of a portion of the device showing more particularly the manner in which the movement of the pedal is limited. Fig. 6 represents a perspective view showing a construction employed for permitting the loosening of the belt.

Similar numerals of reference indicate corresponding parts in the figures.

Referring to the drawings, 1 designates the frame of the machine which carries the bearings 2 in which is journaled the driving shaft 3, on which is mounted the driving pulley 4.

5 designates a pulley mounted on the driving shaft 3 around which passes the belt 6, said belt also passing around a pulley 7 mounted on a shaft 8. The shaft 8 is journaled in the bearings 9 which are provided with upward extensions 10 having slots 11 therein, thereby adapting the same to be adjustably secured to one of the uprights of the frame by means of set screws or equivalent devices 12. The arm 10 is provided with a slotted or apertured lug 13 in which is seated the pin 14 extending from the link 15 carried by the rod 16 which latter is rotatably mounted in the bracket 17. The bracket 17 is provided with a slot 18 whereby the same may be adjustably secured to one of the uprights of the frame by means of the set screw 19. The rod 16 is provided with any suitable sort of actuating handle or lever 20. The bracket 17 is provided with an extension 21 in which or by which the upper end of the arm 10 is guided. The shaft 8 has secured thereto a plurality of sprockets 22 around one of which passes the sprocket chain 23, which also passes around the sprocket wheel 24 mounted on a shaft 25, which is journaled in a box 26, which latter is movably mounted in the support 27.

28 designates a sprocket chain which passes around the other of the sprockets 22 and also around a sprocket 29 mounted on a shaft 30 which is journaled in a box 31 which is also movably mounted in the support 27. The shafts 25 and 30 are provided with cutting rollers 32, the contour of which is varied according to the shape which it is desired to give the candy. The supports 27 are recessed as at 33 in order to form guides for the journal 34, in which is mounted a shaft 35 on which the roller 36 is mounted, said roller serving as a support for the candy which is to be cut and shaped. The bushings 37 in which the end of the shafts 25 and 30 are journaled have mounted thereon one end of the toggles 38 and 39, the other ends thereof being apertured and provided with a bushing 40 in which the ends of the shaft 35 is journaled. The toggles 38 and 29 have secured thereto a rod 41 which is provided at its lower end with a right hand thread.

42 designates a rod or connection provided at its upper end with a left hand thread, whereby the rods 41 and 42 may be adjusted with respect to each other by means of a coupling 43, a lock nut 44 being provided if desired. The lower end of the rod 42 is pivoted to a link or rock arm 45, which latter is secured to a rock shaft 46 journaled in any suitable manner.

47 designates a lever, one end of which is secured to the rock shaft 46, the other end thereof being adapted to be actuated by the foot of the operator. The lever 47 is normally maintained in its raised position by means of a spring 48, one end of which is operatively connected with the lever 47, the other end thereof being operatively connected with any suitable fixed portion of the frame.

49 designates a lever, one end of which is fixed to the shaft 46 by means of a set screw or equivalent device 50, said lever 49 being provided with laterally extending portions 51 and 52 through which pass set screws 53 and 54 whereby the amount of movement of the lever 47 is limited, as desired. The shaft 46 has also mounted thereon an arm 55, the upper end of which is slotted, as indicated at 56.

57 designates a connecting arm, one end of which is adjustably secured by any suitable means in the slot 56, the other end thereof being adjustably secured in a slot 58 of an arm 59, which is fulcrumed on the shaft 60, the upper end of said arm 59 being provided with a pawl 61 which coacts with a ratchet wheel 62 fixedly mounted on the shaft 60. The shaft 60 has mounted thereon a roller 63 around which passes an apertured belt or carrier 64, said carrier also passing around a roller 65 which is suitably journaled in a shaft 66 carried by the frame of the machine, it being noted that said shaft 66 is located at the opposite end of the machine in proximity to the vertical plane of the cutting rollers.

67 designates a casing carried by the frame and adapted to receive anything falling through the belt 64. The side members of the frame are provided at one end with guides 68 whereby the candy carried by the carrier 64 is guided to the table 69.

70 designates a pulley mounted on the driving shaft 3 around which passes a belt 71 which also passes around a pulley 72, which is adapted to drive the blowing mechanism 73 of any suitable or conventional type whereby a current of air will be directed against the apron or carrier 64.

74 designates a belt passing around the pulley 72 and also around a pulley 75 mounted on the shaft 35.

76 designates a rock shaft suitably journaled in the support 27 and provided with an actuating handle 77 and rock arms 78, said rock arms 78 having secured thereto a blade 79 which is adapted to force the candy between the cutting rollers 32, and prevents the same from coming out during the cutting and forming operation.

80 designates the clutch mechanism which may be of any suitable or conventional type.

81 designates a plate which is slotted as indicated at 82 whereby it may be adjustably secured to the frame by the fastening device 12. The plate is apertured at 83 in order that the lever 47 may extend therethrough, said plate serving as an adjustable stop for the lever 47.

In order that the cutting portions of the rollers will not come into contact with each other and thereby injure their cutting edge, I preferably employ a set screw 84 carried by one of the journal boxes in the present instance by the box 31 and provided with a lock nut 85 whereby said set screw may be maintained in its adjusted position, it being apparent that the set screw 84 will abut against the journal 26 during the operation, as will be readily apparent from Fig. 3.

The operation of my novel construction of candy machine will now be readily apparent. The machine is thrown into action by means of the clutch mechanism 80, whereupon it will be apparent that the cutting rollers 32 will be driven in the same direction, since the belt 6 is crossed and that the non-cutting roller 36 will be driven in the opposite direction. The candy is placed in a strip on top of the roller 36. The operator then depresses the lever 47 thereby rocking the shaft 46 and causing the connecting rod 42 to be drawn downwardly, which will cause the roller 36 to move downwardly and owing to the employment of the toggles 38 and 39 secured to the rod 41 the cutting rollers 32 will be drawn toward each other. The handle 77 is now actuated thereby causing the blade 79 to force the strip of candy down between the cutting rollers 32, it being apparent that as soon as the operator releases his pressure upon the lever 47 the spring 48 will cause the same to return to its normal position and the roller 36 to be raised and owing to the provision of the toggles, the cutting rollers will be separated from each other. The candy is now removed from between the cutting rollers 32 so that it passes down the guide 81$^x$ on to the conveyer 64. It will be apparent that each time the lever 47 is depressed owing to the provision of the rock arm 55, connecting arm 57, lever 59, pawl 61 and ratchet 62 that the conveyer belt 64 will be actuated the desired distance, varying according to the adjustment of the connecting arm 57 with the levers 55 and 59.

As the candy passes beneath the blowing mechanism 72 a current of air will be driven thereagainst and the candy will be gradually cooled, which is an important feature in the manufacture of many kinds of candy. As the belt is intermittently actuated the candy carried thereby will pass therefrom on to the table 69 from whence it can be readily removed for further treatment or packed for shipment.

I wish to call special attention to the manner in which the toggle arms are mounted. In the machines of this character, as heretofore constructed, the toggle arms were mounted on the rotating shafts of the cutting rollers so that the life of the toggle arms was comparatively short. In my novel construction I employ the stationary bushings 37 in which the shafts 25 and 30 rotate and the toggle arms 38 and 39 are mounted on the stationary bushings so that the wear on the toggle arms is comparatively slight and since the inner ends of the toggles are provided with a bushing, it is simply necessary to replace this bushing when the same becomes worn instead of replacing the entire toggle arms, as has heretofore been necessary.

Owing to the employment of the adjustable bearing 9 the sprocket chains 23 and 28 may be readily loosened. In machines of this character it is essential that they be so constructed that the different rollers may be readily and quickly changed since many different forms and sizes of candy are made in the same machine. In order to accomplish this purpose, I have devised a construction in which the shaft 8 around which the chains pass to actuate the cutting rollers is adjustable, said shaft 8 being mounted in the bracket or journal 9. When it is desired to change the cutting rollers it is simply necessary to loosen the set screw 12 and actuate the handle 20 as is clearly indicated in Fig. 6, whereupon the journal 9 may be raised, thereby loosening the sprocket chains 23 and 28 so that the cutting rollers may be readily and quickly changed without loss of time. The amount of movement given to the traveling carrier 64 may be regulated by adjusting the connecting rod 57 in the slots 56 and 59, as will be apparent to those skilled in this art. The amount of movement given to the rock shaft 46 may also be adjusted as desired by adjusting the set screws 53 and 54. The bracket 17 may also be adjusted owing to the provision of the slot 18 and the fastening device therefor.

It will be apparent that while in the present instance I have shown the blowing mechanism as located above the traveling carrier that the same may be located beneath the same and it will operate in exactly the same manner and produce substantially the same results.

It will now be apparent to those skilled in the art that I have devised a novel and useful construction of candy machine which embodies the features of advantage enumerated as desirable in the statement of invention and the above description and while I have in the present instance shown and described a preferred embodiment thereof which has been found in practice to give satisfactory and reliable results, it will be apparent that the same is susceptible of modification in various particulars without departing from the spirit and scope of the invention or sacrificing any of its advantages.

Having thus described my invention, what I claim as new and desire to secure by Letters Patent, is:

1. In a candy machine, driving means, a plurality of cutting rollers driven thereby, means for moving said rollers into and out of operative relation, and vertically movable devices for forcing the candy into engagement with said rollers.

2. In a candy machine, a support, a plurality of cutting rollers mounted therein and laterally movable, a candy-supporting roller interposed between the cutting rollers driving means for said rollers, bushings for the ends of the shafts of said toggles a conveyer, means for intermittently actuating said conveyer, and devices operatively connected therewith for controlling the lateral movement of said cutting rollers.

3. In a candy machine, a support, a plurality of cutting rollers mounted therein and laterally movable, a candy-supporting roller interposed between the cutting rollers driving means therefor, an endless conveyer, devices for intermittently actuating said conveyer, means for adjusting the amount of movement given to said conveyer, and toggle means for causing said cutting rollers to move toward and away from each other simultaneously with the actuation of said conveyer bushings for the ends of the shafts of said toggles.

4. In a candy machine, an endless conveyer, a roller therefor, a shaft for said roller, a ratchet carried by said shaft, a lever, a pawl carried thereby coacting with said ratchet, said lever having a slot therein, a connecting arm, one end of which is adjustably secured in said slot, a rock arm having a slot therein to which the other end of said connecting arm is adjustably secured, means for actuating said rock arm, cutting rollers, toggle mechanism therefor operatively connected with said rock arm and devices for limiting the amount of movement given to said rock arm bushings for the ends of the shafts of said toggles.

5. In a candy machine, a support, a bracket adjustably carried thereby, a journal adjustably carried by said support, means carried by said bracket for adjusting said journal, a shaft mounted in said journal, sprocket wheels thereon, driving means for said shaft, a plurality of cutting rollers, means operatively connected therewith and with said sprockets for actuating said rollers, a candy-supporting roller interposed between and movable with the cutting rollers means for rendering said rollers operative or inoperative and a vertically oscillatory device for forcing the candy into engagement with the cutting rollers.

6. In a candy machine, the combination of a conveyer, a ratchet wheel adapted to actuate said conveyer, means including a rock shaft for actuating said sprocket wheel, a lever fixedly mounted on said shaft, a treadle loosely mounted on said shaft, and set screws carried by said lever and engaging opposite sides of said treadle.

7. In a candy machine, a frame, journals movably mounted and provided with bushings, candy cutting devices having shafts journaled in said bushings, toggle arms one end of which are mounted on said bushings, a candy support having a shaft journaled in the other end of said toggle arms, actuating means for said candy cutting devices and said support and a vertically oscillatory device for forcing the candy into engagement with the cutting devices.

8. In a candy machine, a frame, journals movably mounted and provided with bushings, cutting rolls having shafts journaled in said bushings, toggles having one end mounted on said bushings, a candy support having a shaft mounted in the other end of said toggles, actuating means for said shafts, means for limiting the distance to which one roll can approach the other and a vertically oscillatory device for forcing the candy into engagement with the cutting devices.

9. In a candy machine, a frame, journals movably mounted and provided with bushings, a set screw adjustably carried by one journal, and adapted to engage the other, cutting rolls having shafts journaled in said bushings, toggles having one end mounted on said bushings, a candy support having a shaft mounted in the other end of said toggles, actuating means for said shafts, and means for limiting the distance to which one roll can approach the other.

10. In a candy machine, cutting rolls having shafts, a vertically oscillatory device for forcing the candy into engagement with said rolls non-rotatable bushings for said shafts, toggles mounted on said bushings, a rotatable candy support mounted in the other ends of said toggles, a member having one end connected with said candy support, a treadle to which the other end of said member is secured, a tension device for said treadle, and actuating means for said support and cutting rolls.

11. In a candy machine, cutting rolls having shafts, a vertically oscillatory device for forcing the candy into engagement with said rolls non-rotatable bushings for said shafts, toggles mounted on said bushings, a rotatable candy support mounted in the other ends of said toggles, a member having one end connected with said candy support, a treadle to which the other end of said member is secured, means for varying the length of said member, a tension device for said treadle, and actuating means for said support and cutting rolls.

12. In a candy machine, cutting rolls having shafts, a vertically oscillatory device for forcing the candy into engagement with said rolls non-rotatable bushings for said shafts, toggles mounted on said bushings, a rotatable candy support mounted in the other ends of said toggles, a member having one end connected with said candy support, a treadle to which the other end of said member is secured, an adjustable stop for said treadle, a tension device for said treadle, and actuating means for said support and cutting rolls.

13. In a candy machine, a frame, a bracket adjustably carried thereby, a journal adjustably supported and having an extension guided by said bracket, means carried by said bracket for raising and lowering said journal, a shaft mounted in said journal, driving means therefor, candy cutting mechanism driven by said shaft and a vertically oscillatory device for forcing the candy into engagement with said cutting mechanism.

14. In a candy machine, a plurality of cutting rollers, means for moving said rollers into and out of operative relation, vertically oscillatory means for forcing the candy into engagement with said rollers, a candy supporting roller independent of said forcing means, and positive driving means for said cutting rollers whereby the same will travel evenly and no variation thereof is permitted.

JOHN SMITH.

Witnesses:
 EDWIN F. ROBERTS,
 SAMUEL PLON.